No. 627,387.  
J. E. BROWN.  
EXCAVATING SCOOP.  
(Application filed Feb. 1, 1899.)  
Patented June 20, 1899.
(No Model.) 2 Sheets—Sheet 1.
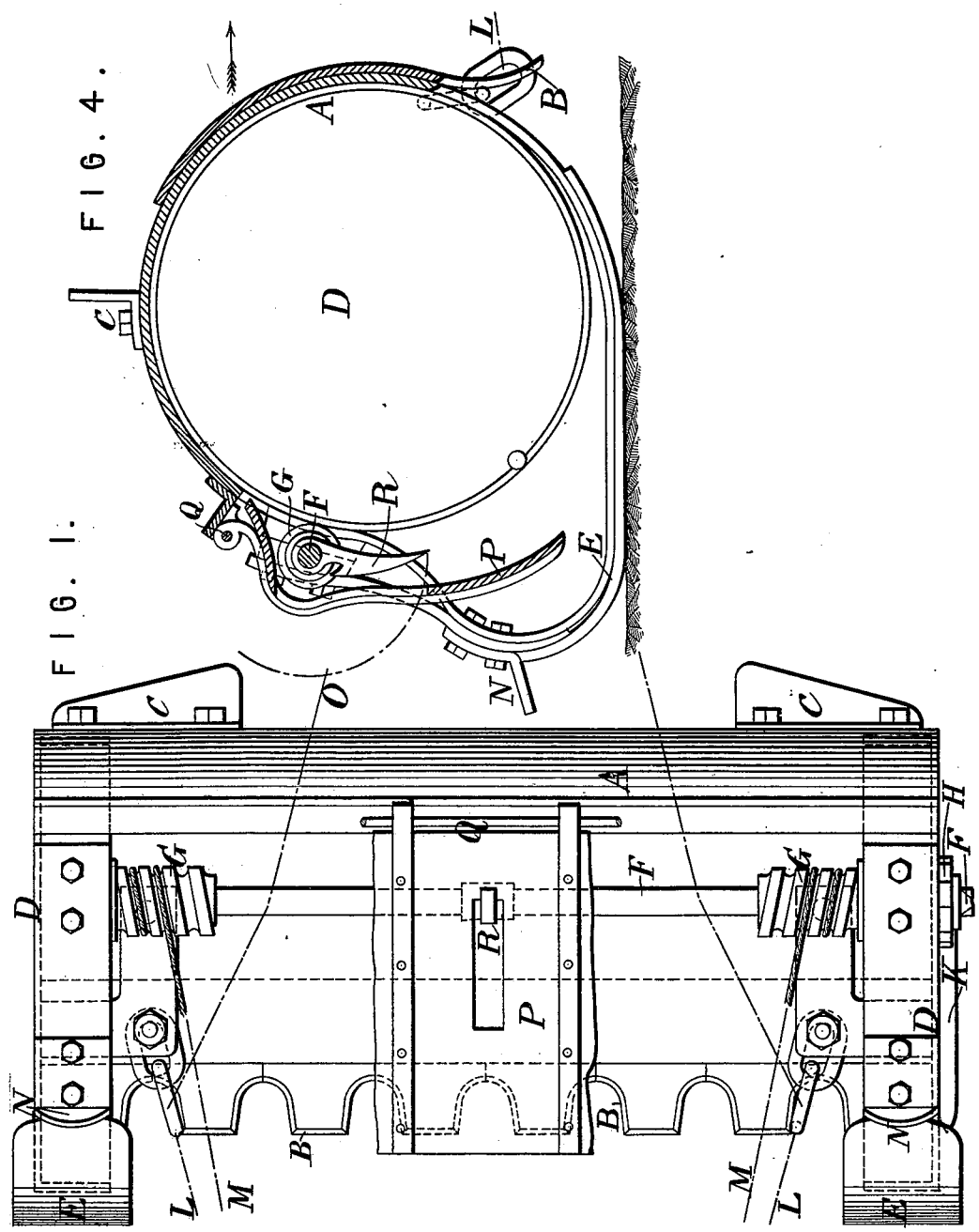

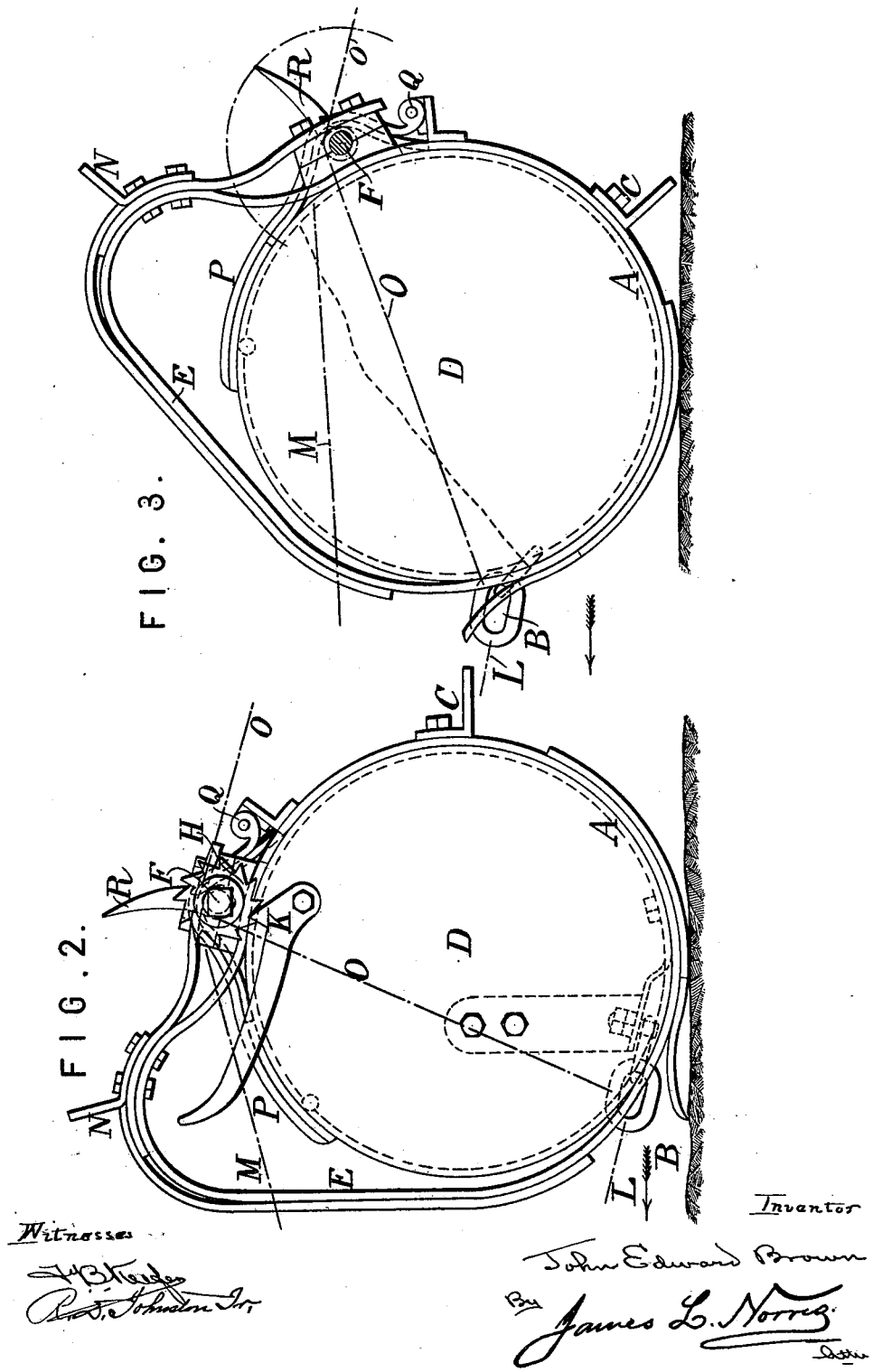

UNITED STATES PATENT OFFICE.

JOHN EDWARD BROWN, OF ALTON, ENGLAND, ASSIGNOR TO THE MORNE-
NENT & WRIGHT, LIMITED, OF EAST HARLING, ENGLAND.

EXCAVATING-SCOOP.

SPECIFICATION forming part of Letters Patent No. 627,387, dated June 20, 1899.

Application filed February 1, 1899. Serial No. 704,129. (No model.)

*To all whom it may concern:*

Be it known that I, JOHN EDWARD BROWN, a citizen of England, residing at Alton, in the county of Hants, England, have invented certain new and useful Improvements in Excavating-Scoops, (for which I have obtained patents in Great Britain, No. 15,064, dated July 8, 1898; in France, No. 279,604, dated July 8, 1898, and in Belgium, No. 136,711, dated July 8, 1898,) of which the following is a specification.

My invention relates to scoops of the kind described in my previous British specification, No. 1,610 of 1891, and has for its object improvements in such scoops by which they are rendered suitable for excavating and moving soil, dredging, enlarging, or forming ponds or reservoirs, and other like operations.

I shall describe my improved scoop, referring to the accompanying drawings.

Figure 1 is a plan of the scoop when it is in the position shown in end elevation; Fig. 2, its cutting edge being about to enter the soil. Fig. 3 is an end elevation showing the scoop in position to be drawn along containing its charge. Fig. 4 is a transverse section showing the scoop in position to be emptied and drawn along the ground on its sledge-runners.

The scoop consists of an approximately semicylindrical shell A, with an outwardly-curved toothed cutting or digging edge B and with a pair of projecting brackets C to penetrate the soil and act as a fulcrum for the scoop when it is turned over. To the ends D, which are circular, are attached sledge-runners E, on which the scoop can be drawn from place to place. On the ends are also provided bearings for a transverse spindle F, having two worm-bosses G for winding ropes and having at one end a ratchet-wheel H, with pawl K, provided with a handle by which it can be engaged or disengaged. Near the digging edge are attached two chains L, which extend obliquely to meet in a single shackle, and to the same shackle are attached two ropes M, which extend obliquely to the bosses G G. When the chains L and ropes M are drawn by engines or draft-animals, then, according as the ropes M are more or less tightened by turning the spindle F by a winch-handle applied to its end, the digging edge B is more or less driven into the ground, as shown in Fig. 2, and as the scoop proceeds it becomes charged with soil. When the scoop is sufficiently charged, the pawl K is disengaged, and then the scoop takes the position shown in Fig. 3 and is drawn along to the place of deposit. When it reaches this place, a pair of ropes O, leading backward from the fixings of the chains L, are pulled, so as to turn the scoop over to an upside-down position, as shown in Fig. 4, emptying it, whereupon it can be drawn on the sledge-runners back to operate again.

Projections N serve to lift and then drop the scoop as it is turning over, thus more effectually emptying it.

In order to increase the capacity of the scoop, it is preferably provided with a door P, the middle part of which is shown in Fig. 1. It is hinged to the scoop at Q and is bent so as to close over the shaft F and its worms. The door is held in its closed position by a pawl-catch R, which is pivoted at the middle of the shaft F and passes through a slot provided for it through the door. In turning the scoop over for the purpose of emptying it the catch R, as it passes over the ground, is pushed inward, leaving the door P free to open, as shown in Fig. 4, so that the contents of the scoop readily escape. In turning the scoop over to the digging position the door P is closed and held so by the catch R.

Having thus described the nature of this invention and the best means I know for carrying the same into practical effect, I claim—

1. In an excavating-scoop, the combination with an approximately semicylindrical shell having sledge-runners at its ends, of a shaft external to the shell but parallel with its axis, draft-chains extending from a common shackle to connections at the ends of the shell near its digging edge, ropes diverging from the common shackle to worm-bosses on the external shaft, and a ratchet and pawl to hold said shaft at any point to which it is turned, substantially as described.

2. In an excavating-scoop, the combination with a shell having a digging edge, of draft-chains connected to the shell near the ends of said edge, an external shaft parallel to said edge and upon the opposite side of the axis of the shell, ropes winding on worm-bosses on said shaft and connected to the shackle for the chains, a ratchet on the shaft and a pawl on the shell to engage said ratchet, said pawl having a handle by which it may be disengaged, substantially as described.

3. In an excavating-scoop, the combination with a shell open on one side and provided with an outwardly-curved digging edge, of a shaft external to the shell and parallel with said edge, a door hinged on said shell to close over said shaft, and a pawl-catch pivoted on said shaft and passing through a slot in the door, substantially as described.

4. In an excavating-scoop, the combination with a shell having an outwardly-curved digging edge, of a shaft parallel to said edge and on the opposite side of the axis of the shell, draft-chains connected to a common shackle and to the ends of the shell near said edge, ropes connected to said shackle and to worm-bosses on the ends of the shaft, a ratchet and pawl on said shaft and shell, respectively, and sledge-runners upon the ends of the shell having projections to engage the ground when the scoop is emptied, substantially as described.

In testimony whereof I have hereunto set my hand in presence of two subscribing witnesses.

JOHN EDWARD BROWN.

Witnesses:
FREDERIC HALE,
WILLIAM J. MASON.